(12) United States Patent
Washington

(10) Patent No.: US 11,826,924 B2
(45) Date of Patent: *Nov. 28, 2023

(54) SHAVING RAZOR CARTRIDGE AND METHOD OF MANUFACTURE

(71) Applicant: The Gillette Company LLC, Boston, MA (US)

(72) Inventor: Jack Anthony Washington, Mendon, MA (US)

(73) Assignee: The Gillette Company LLC, Boston, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/675,697

(22) Filed: Feb. 18, 2022

(65) Prior Publication Data

US 2022/0168915 A1  Jun. 2, 2022

Related U.S. Application Data

(63) Continuation-in-part of application No. 16/367,345, filed on Mar. 28, 2019, now Pat. No. 11,285,629.
(Continued)

(51) Int. Cl.
*B26B 21/52* (2006.01)
*B26B 21/40* (2006.01)
(Continued)

(52) U.S. Cl.
CPC .......... *B26B 21/521* (2013.01); *B26B 21/222* (2013.01); *B26B 21/4068* (2013.01);
(Continued)

(58) Field of Classification Search
CPC . B26B 21/521; B26B 21/222; B26B 21/4068; B26B 21/4018; B26B 21/4025; B29C 45/1676; B29K 2995/0021
See application file for complete search history.

(56) References Cited

U.S. PATENT DOCUMENTS 2,424,260 A   7/1947  Nicholas
3,833,146 A   9/1974  Braginetz
(Continued)

FOREIGN PATENT DOCUMENTS

DE   202006011254 U1   12/2006
GB        1565415 A    4/1980
(Continued)

OTHER PUBLICATIONS

All Office Actions, U.S. Appl. No. 16/367,327, filed Mar. 28, 2019.
(Continued)

*Primary Examiner* — Evan H MacFarlane
*Assistant Examiner* — Liang Dong
(74) *Attorney, Agent, or Firm* — John M. Lipchitz

(57) ABSTRACT

A shaving razor cartridge with a housing having a top surface and a bottom surface. A guard is at the front of the housing. A cap is at a rear of the housing. At least one blade is mounted to the housing between the guard and the cap. The housing has a wall defining an opening extending from the top surface to the bottom surface that is configured to receive a portion of a handle. The wall having a pair of arms each with a distal end extending toward each other defining a gap. The bridge is a thermo-plastic elastomer that is different than a polymeric material of the housing.

11 Claims, 10 Drawing Sheets

Related U.S. Application Data

(60) Provisional application No. 62/650,393, filed on Mar. 30, 2018.

(51) Int. Cl.
  *B26B 21/22* (2006.01)
  *B29C 45/16* (2006.01)

(52) U.S. Cl.
  CPC ....... *B26B 21/4018* (2013.01); *B26B 21/4025* (2013.01); *B29C 45/1676* (2013.01); *B29K 2995/0021* (2013.01)

(56) References Cited

U.S. PATENT DOCUMENTS

| | | |
|---|---|---|
| 4,189,832 A | 2/1980 | Buras, Jr. et al. |
| 4,345,374 A | 8/1982 | Jacobson |
| 5,533,263 A * | 7/1996 | Gilder .................. B26B 21/521 |
| | | 30/527 |
| 5,794,343 A | 8/1998 | Lee |
| 6,029,354 A | 2/2000 | Apprille, Jr. et al. |
| 6,612,040 B2 | 9/2003 | Gilder |
| 6,807,739 B2 | 10/2004 | Follo |
| 7,168,173 B2 | 1/2007 | Worrick, III |
| 7,303,934 B2 | 12/2007 | Van Beek et al. |
| 8,726,519 B2 | 5/2014 | Clarke et al. |
| 9,381,657 B2 | 7/2016 | Xu et al. |
| 2003/0074798 A1 * | 4/2003 | Follo .................... B26B 21/225 |
| | | 30/527 |
| 2003/0222100 A1 | 12/2003 | Husband et al. |
| 2005/0223568 A1 | 10/2005 | Walker et al. |
| 2006/0179661 A1 | 8/2006 | Walker et al. |
| 2010/0236071 A1 | 9/2010 | Szczepanowski et al. |
| 2013/0081291 A1 | 4/2013 | Wain et al. |
| 2013/0255088 A1 | 10/2013 | Christie et al. |
| 2014/0000114 A1 | 1/2014 | Wester et al. |
| 2014/0366361 A1 | 12/2014 | Wain et al. |
| 2015/0273709 A1 * | 10/2015 | Carneiro ............. B26B 21/4018 |
| | | 30/41 |
| 2016/0075041 A1 | 3/2016 | Provost et al. |
| 2016/0332313 A1 | 11/2016 | Oconnor |
| 2019/0299458 A1 | 10/2019 | Washington |
| 2019/0299463 A1 | 10/2019 | Patel et al. |
| 2019/0344460 A1 | 11/2019 | Davos et al. |

FOREIGN PATENT DOCUMENTS

| | | |
|---|---|---|
| JP | S60134484 U | 9/1985 |
| JP | 2006204668 A | 8/2006 |
| JP | 2008540053 A | 11/2008 |
| JP | 2012504033 A | 2/2012 |
| JP | 2020051830 A | 4/2020 |
| JP | 2020518309 A | 6/2020 |
| KR | 20170059091 A | 5/2017 |
| WO | 2010065366 A1 | 6/2010 |
| WO | 2010078564 A2 | 7/2010 |
| WO | 2016010825 A1 | 1/2016 |

OTHER PUBLICATIONS

All Office Actions, U.S. Appl. No. 16/367,345, filed Mar. 28, 2019.
All Office Actions; U.S. Appl. No. 17/307,552, filed 05/04/201.
15086 PCT Search Report and Written Opinion for PCT/US2019/023066 dated Jun. 11, 2019, 14 pages.
U.S. Appl. No. 17/307,552, filed May 4, 2021, to Ashok Bakul Patel.

* cited by examiner

SHAVING RAZOR CARTRIDGE AND METHOD OF MANUFACTURE

FIELD OF THE INVENTION

The present invention relates to wet shaving safety razors and more particularly to shaving cartridges that can be removably attached to a handle.

BACKGROUND OF THE INVENTION

In general, a cartridge or blade unit of a safety razor has at least one blade with a cutting edge which is moved across the surface of the skin being shaved by means of a handle to which the cartridge is attached. Some shaving razors are provided with a spring biased cartridge that pivots relative to the handle to follow the contours of the skin during shaving. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled.

Razor blade assemblies have been disclosed wherein cutting edge portions of the blade members are held between skin engaging surfaces which are generally referred to as the guard and cap of the razor blade assembly. The guard contacts the skin in front of the blade member(s) and the cap contacts the skin behind the blade member(s) during a shaving stroke. The cap and guard may aid in establishing the so-called "shaving geometry", i.e., the parameters which determine the blade orientation and position relative to the skin during shaving, which in turn have a strong influence on the shaving performance and efficacy of the razor. The cap may comprise a water leachable shaving aid to reduce drag and improve comfort. The guard may be generally rigid, for example formed integrally with a frame or platform structure which provides a support for the blades. Guards may also comprise softer elastomeric materials (e.g., thermoplastic elastomers) to improve skin stretching.

High performance wet shaving razors are known as system razors in which the shaving razor cartridge is detachably mounted to a handle, thus allowing the shaving razor cartridge to be replaced by a fresh shaving razor cartridge when blade sharpness has diminished to an unsatisfactory level. Recently many new competitors have entered the shaving razor market, thus giving consumers more choice. However, these razors do not have a universal attachment mechanism, such as USB plug for electronics, which can lead to confusion and improper attachment of the cartridge to the handle. Accordingly, there is a need for a shaving razor cartridge that is more intuitive to attach to a handle.

SUMMARY OF THE INVENTION

In one aspect, the invention features, in general a shaving razor cartridge with a housing having a top surface and a bottom surface. A guard is at a front of the housing. A cap is at a rear of the housing. At least one blade is mounted to the housing between the guard and the cap. The housing has a wall defining an opening extending from the top surface to the bottom surface that is configured to receive a portion of a handle. The bottom surface has a handle docking alignment member indicating an intended direction for the handle to be inserted into the opening.

In another aspect, the invention features, in general a method of manufacturing a shaving razor cartridge. A housing is injection molded with a first polymeric material. At least one blade is mounted to the housing. A handle docking alignment member is positioned on the housing.

In another aspect, the invention features, in general housing for a shaving razor cartridge having a top surface, a bottom surface and a wall defining an opening extending from the top surface to the bottom surface that is configured to receive a portion of a handle. The wall having a pair of arms each with a distal end extending toward each other defining a gap. The gap is arrow shaped.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

Figure 1:
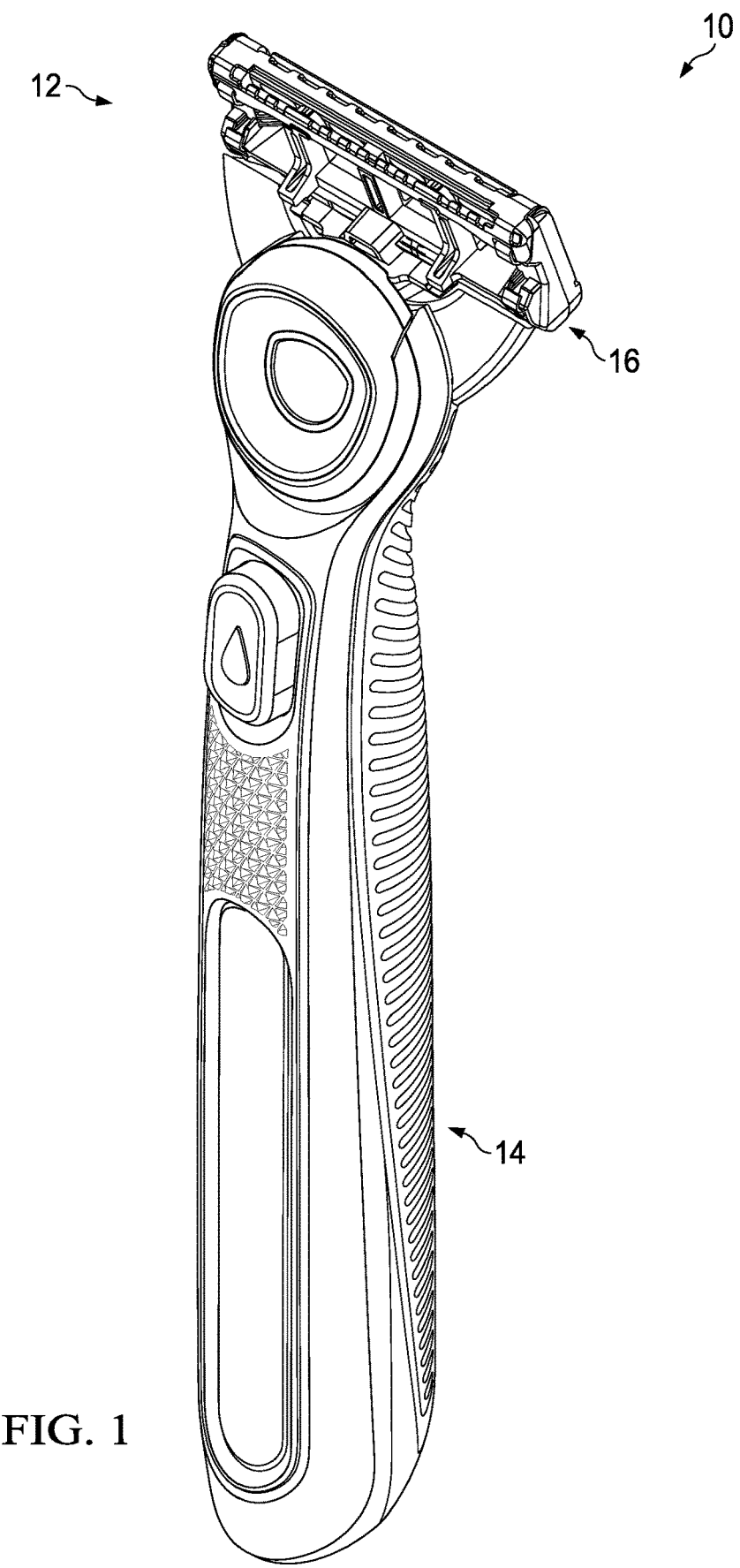
FIG. 1 is a perspective view of a shaving razor.

Referring to FIG. 1, a perspective view of a shaving razor 10 is shown. The shaving razor 10 may include a shaving razor cartridge 12 mounted to a handle 14. The shaving razor cartridge 10 may be removable or permanently mounted to the handle 14. For example, the shaving razor cartridge 12 may be detachably mounted to the handle 14 to enable the shaving razor cartridge 12 to be replaced by a fresh shaving razor cartridge 12 when blade sharpness has diminished to an unsatisfactory level. Alternatively, the shaving razor cartridge 12 may be attached permanently to the handle 14 with the intention that the entire shaving razor 10 be discarded when the blade or blades have become dulled. The shaving razor cartridge 12 may include a housing 16. The housing 16 may be injection molded from a first polymeric material. The housing 16 may be molded from polymers such as high impact polystyrene (HIPS), but other semi-rigid polymers such as polypropylene (PP), nylon, acrylonitrile butadiene styrene (ABS), polyphenylene ether, polystyrene, and combinations thereof may also be used.

Figure 2:
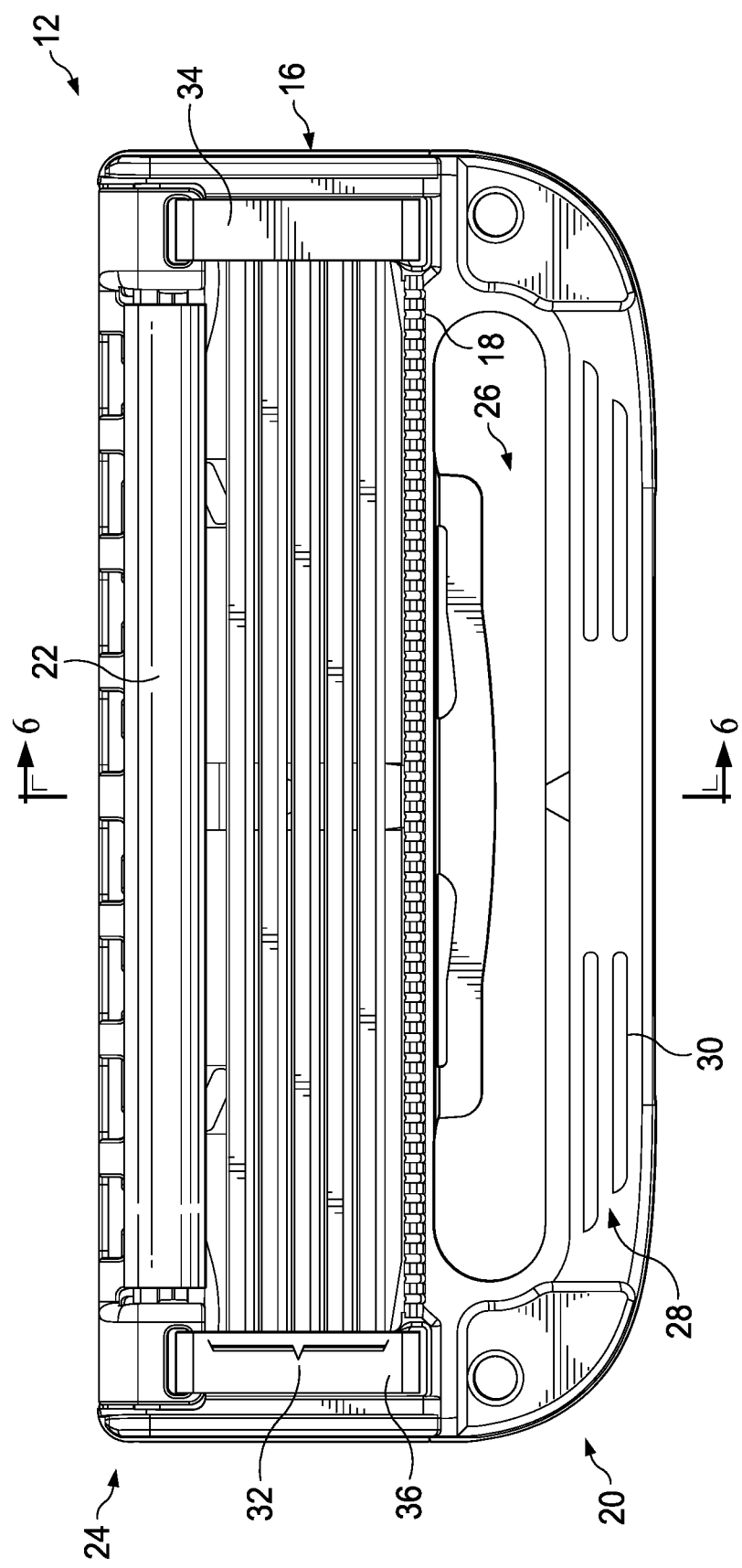
FIG. 2 is a top view of a shaving razor cartridge of FIG. 1.

Referring to FIG. 2, a top view of the shaving razor cartridge 12 of FIG. 1 is shown. A guard 18 may be positioned at a front portion 20 of the housing 16 and a cap 22 may be positioned at a rear portion 24 of the housing 12. The guard 18 may be a unitary elongated member that can be formed of a rigid plastic (e.g., the same material as the housing 16). For example, the guard 18 may be a solid or segmented bar that extends generally parallel to the cap 22 to help support the skin during a shaving stroke. In certain embodiments, the cap 22 may comprise one or more lubricants that are released during shaving.

An opening 26 may extend through the shaving razor cartridge 12. In certain embodiments, the opening 26 may be positioned in front of the guard 18. The opening 26 may be an oval or racetrack shape that extends a significant width of the housing 16. As will be described in greater detail below, the housing 16 may partially define the opening 26. The opening 26 may be configured to receive a portion of the handle 14 (shown in FIG. 1). For example, a portion of the handle 14 may extend into the opening 26 to provide one or more benefits to the user during shaving, such as delivering heat or moisture.

In certain embodiments, the housing 16 may comprise a skin-engaging member 28 (e.g., an thermo-plastic elastomer pad or a plurality of fins or other protrusions 30 to aid in stretching the skin during a shaving stroke) on a top surface of the housing in front of the guard 18. In certain embodiments, the skin-engaging member 28 may be insert injection molded or co-injection molded to the housing 16. However, other known assembly methods may also be used such as adhesives, ultrasonic welding, or mechanical fasteners. As will be explained in greater detail below, the skin engaging member 28 may be molded from a different material than the housing 16. For example, material of the skin engaging member 28 may be molded from an thermo-plastic elastomer material having a lower durometer hardness or modulus compared to the material of the housing 16. In certain embodiments, the skin engaging member 28 may comprise an elastomeric material, such as a thermoplastic elastomer based on styrene block co-polymers. The skin engaging 28 member may comprise a lubricous material or a water leachable shaving aid.

The guard 18 and the cap 22 may define a shaving plane that is tangent to the guard 18 and the cap 22. One or more blade members 32 each having a respective cutting edge may be mounted to the housing 16 between the cap 22 and the guard 18 (i.e., in front of the cap 22 behind the guard 18). Although five blade members 32 are shown, the shaving razor cartridge 12 may have more or fewer blade members 32 depending on the desired performance and cost of the shaving razor cartridge 12. The blade members 32 may be secured to the housing 16 with one or more blade retention members 34 and 36, such as clips.

Figure 3B:
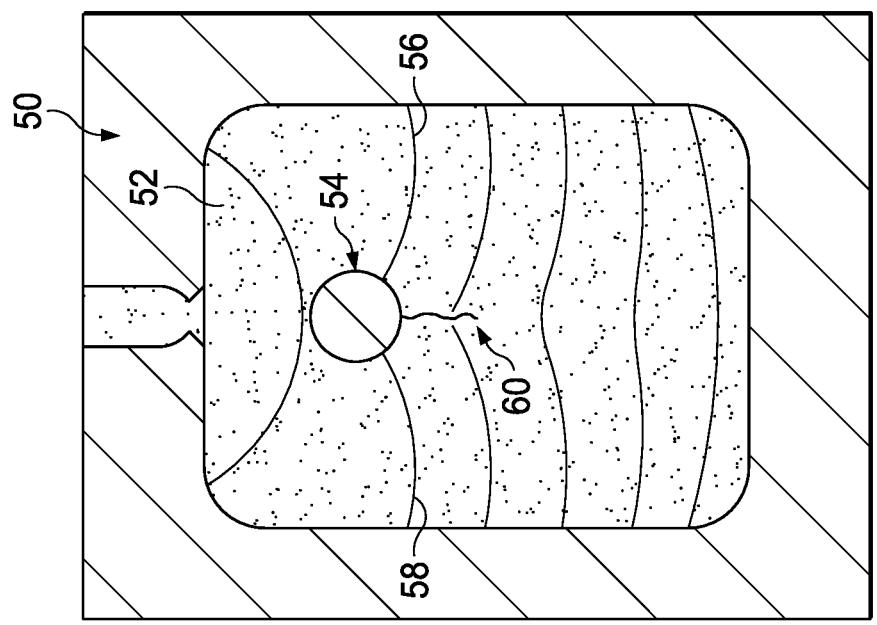
FIG. 3B is a top view of plastic flowing during an injection molding process.
Figure 3A:
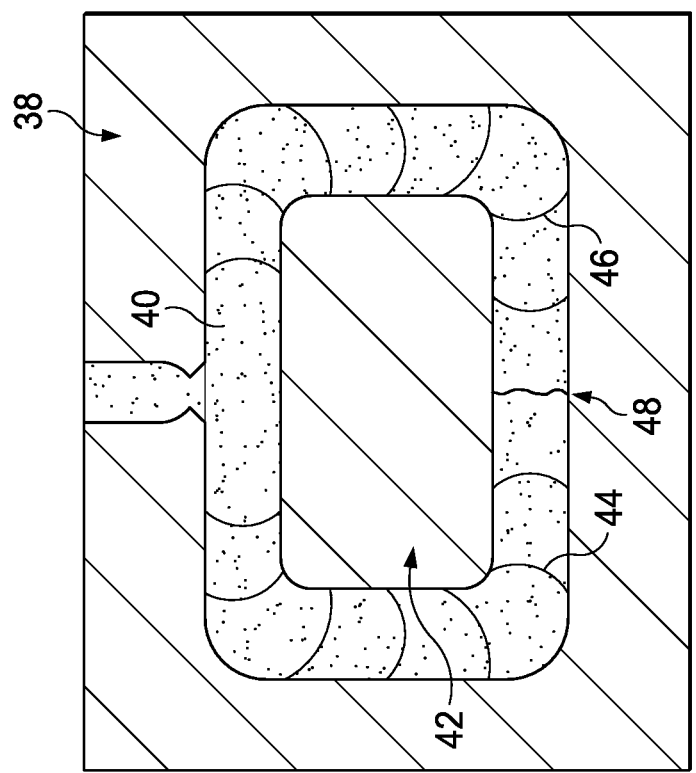
FIG. 3A is a top view of plastic flowing during an injection molding process.

Injection molding is often used to created plastic parts having openings. These openings are created by cores inside the cavity of an injection mold. FIG. 3A is a top view of an injection mold cavity 38 with molten plastic 40 flowing around a core 42 during an injection molding process forming two polymer flow fronts 44 and 46 flowing towards each other in a non-parallel direction. The two polymer flow fronts 44 and 46 meld back together on the other side of the core 42 creating a weld line 48. Weld lines result from plastic flowing around large cores, as shown in FIG. 3A, or small cores, as shown in FIG. 3B. FIG. 3B is a top view of an injection mold cavity 50 with molten plastic 52 flowing around a core 54 during an injection molding process forming two polymer flow fronts 56 and 58 flowing towards each other in a non-parallel direction. The two polymer flow fronts 56 and 58 meld back together on the other side of the core 54 creating a weld line 60. Weld lines result from plastic flowing around large cores, as shown in FIG. 3A, or small cores, as shown in FIG. 3B. Weld lines result in a localized weakened area of plastic components and can act as a crack propagation area because they are located immediately adjacent an opening formed by the core.

Figure 4A:
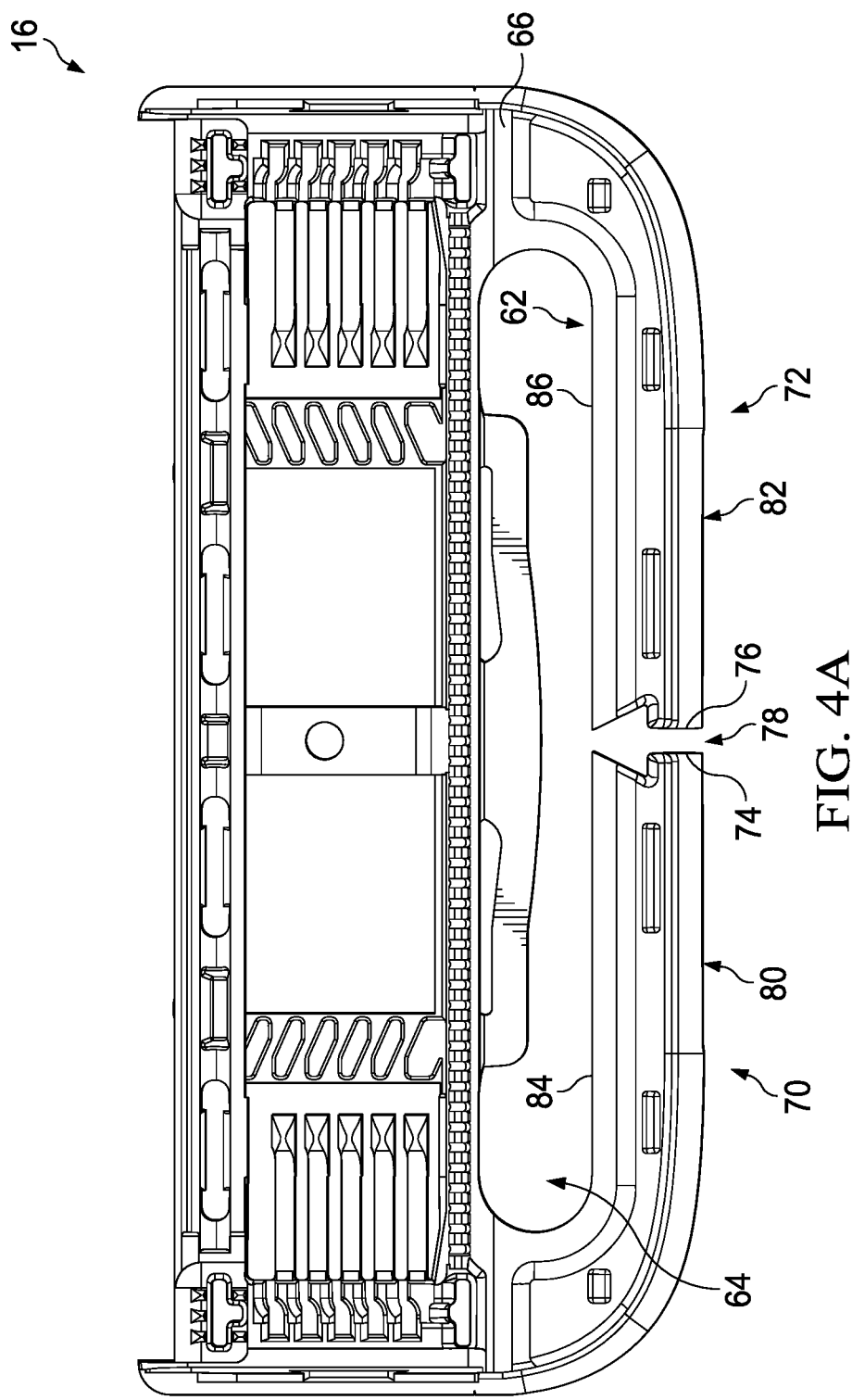
FIG. 4A is a top view of a housing that may be incorporated into the shaving razor cartridge of FIG. 2.
Figure 4B:
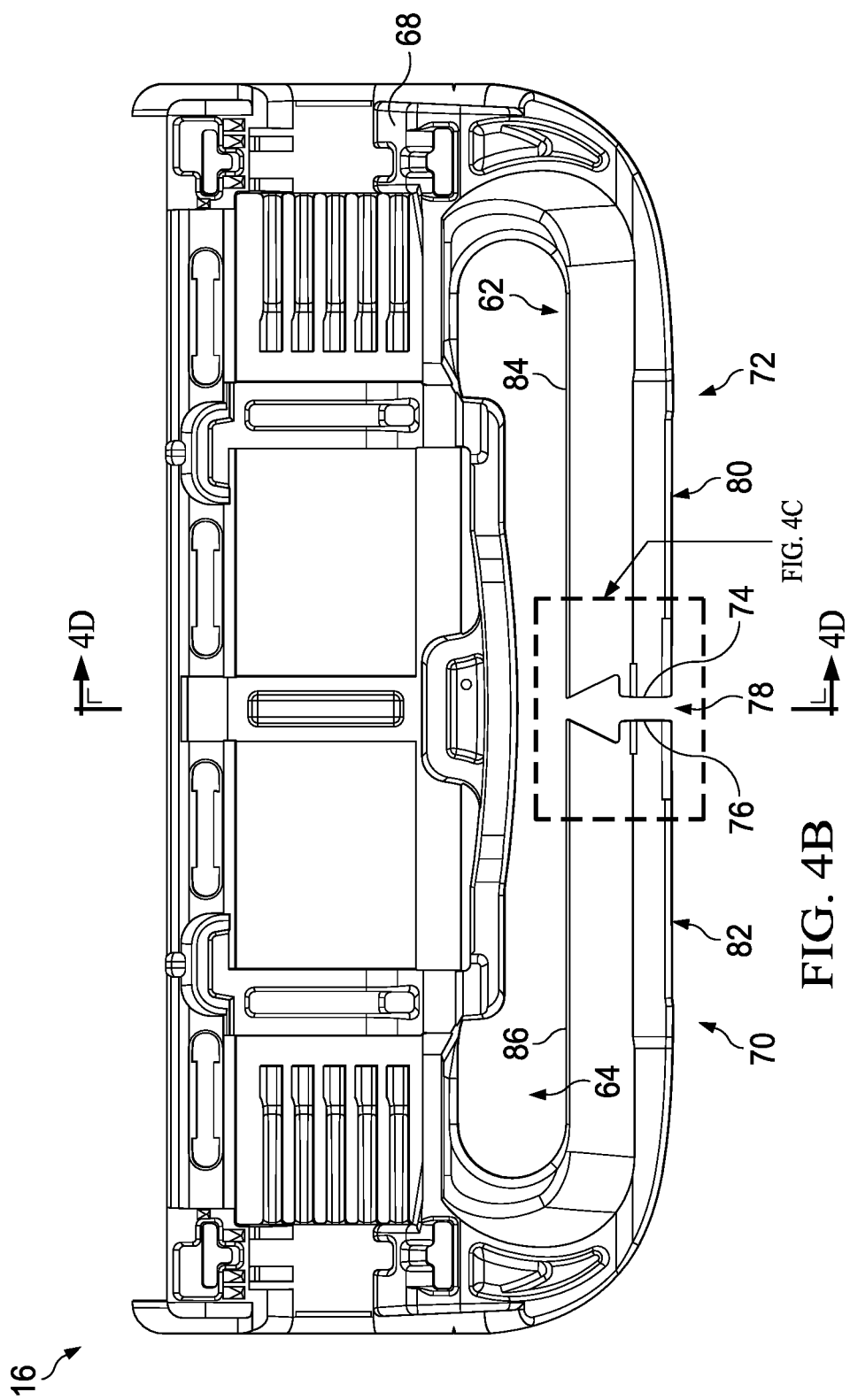
FIG. 4B is a bottom view of the housing of FIG. 4A.

FIG. 4A is a top view of the housing 16 that may be incorporated into the shaving razor cartridge 16. FIG. 4B is a bottom view of the housing of FIG. 4A. The housing 16 may be similar to the component created by the mold cavity of FIG. 3A. The housing 16 may have a wall 62 that defines a partially enclosed opening 64 that extends from a top surface 66 (FIG. 4A) of the housing 16 to an opposing bottom surface 68 (FIG. 4B). It is understood the wall 62 may be an internal perimeter wall and need not extend around the periphery of the housing 16. The wall 62 may include a pair of arms 70 and 72 (e.g., spaced apart sections immediately adjacent an opening) each having a distal end 74 and 76 that extends toward the opposing distal end 74 and 76 define a gap 78 therebetween. The housing 16 may be similar to the part resulting from the mold cavity of FIG. 3A. For example, the two polymer flow fronts 44 and 46 of FIG. 3A may represent the pair of arms 70 and 72 of the housing 16. However, instead of creating the weld line 48 of FIG. 3A, the two distal ends 74 and 76 are created, thus resulting in an improved design. Typically, an opening would be molded by having the wall completely defining the opening (i.e., a fully enclosed opening). However, such a design would result in a weld line (e.g., located along a front wall 80 and 82 of the housing 16), thus resulting in a weaker part. It is believed, without being held to theory, that the housing 16 with the gap 78 produces a part design that is more robust to manufacture, more impact resistant, and more consumer acceptable than a part having a structurally weak weld line.

Figure 4C:
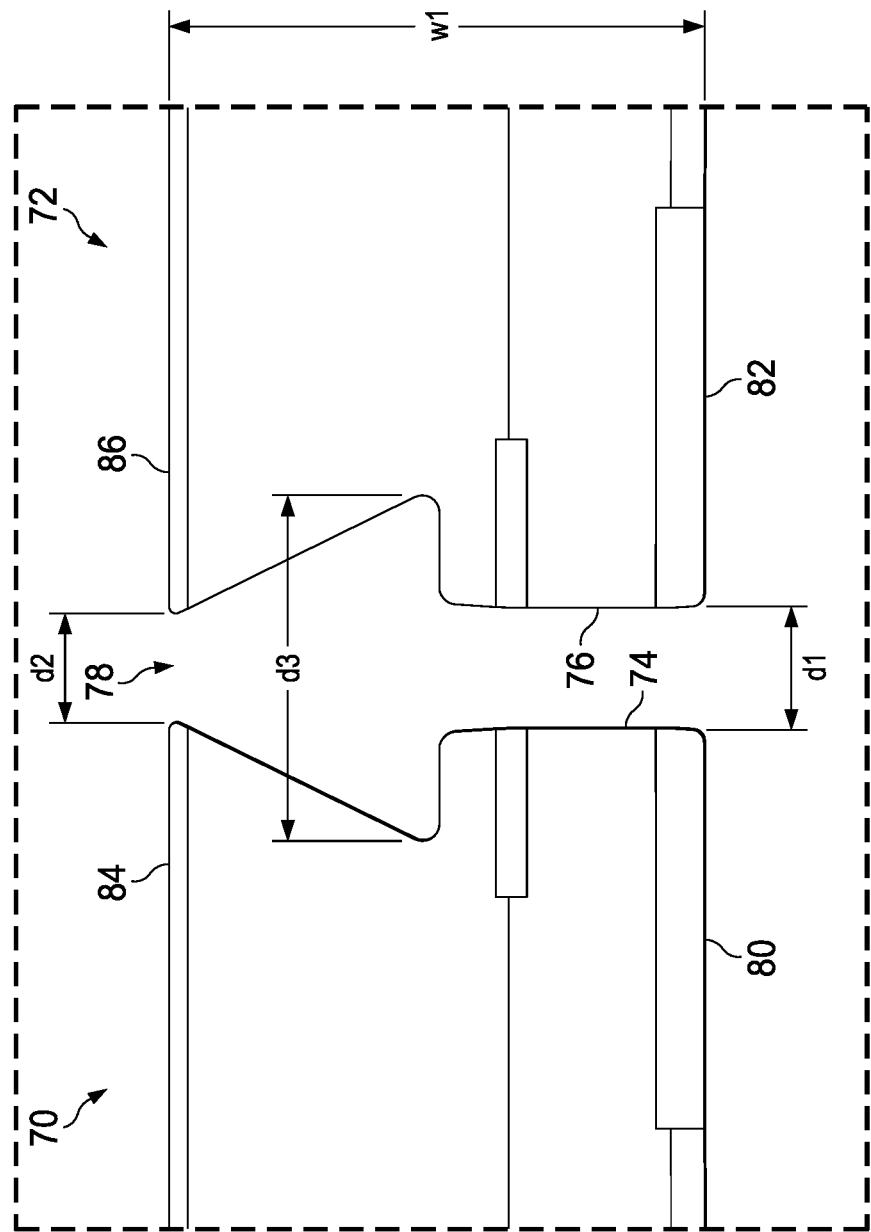
FIG. 4C is an enlarged partial view of the housing of FIG. 4A.
Figure 4D:
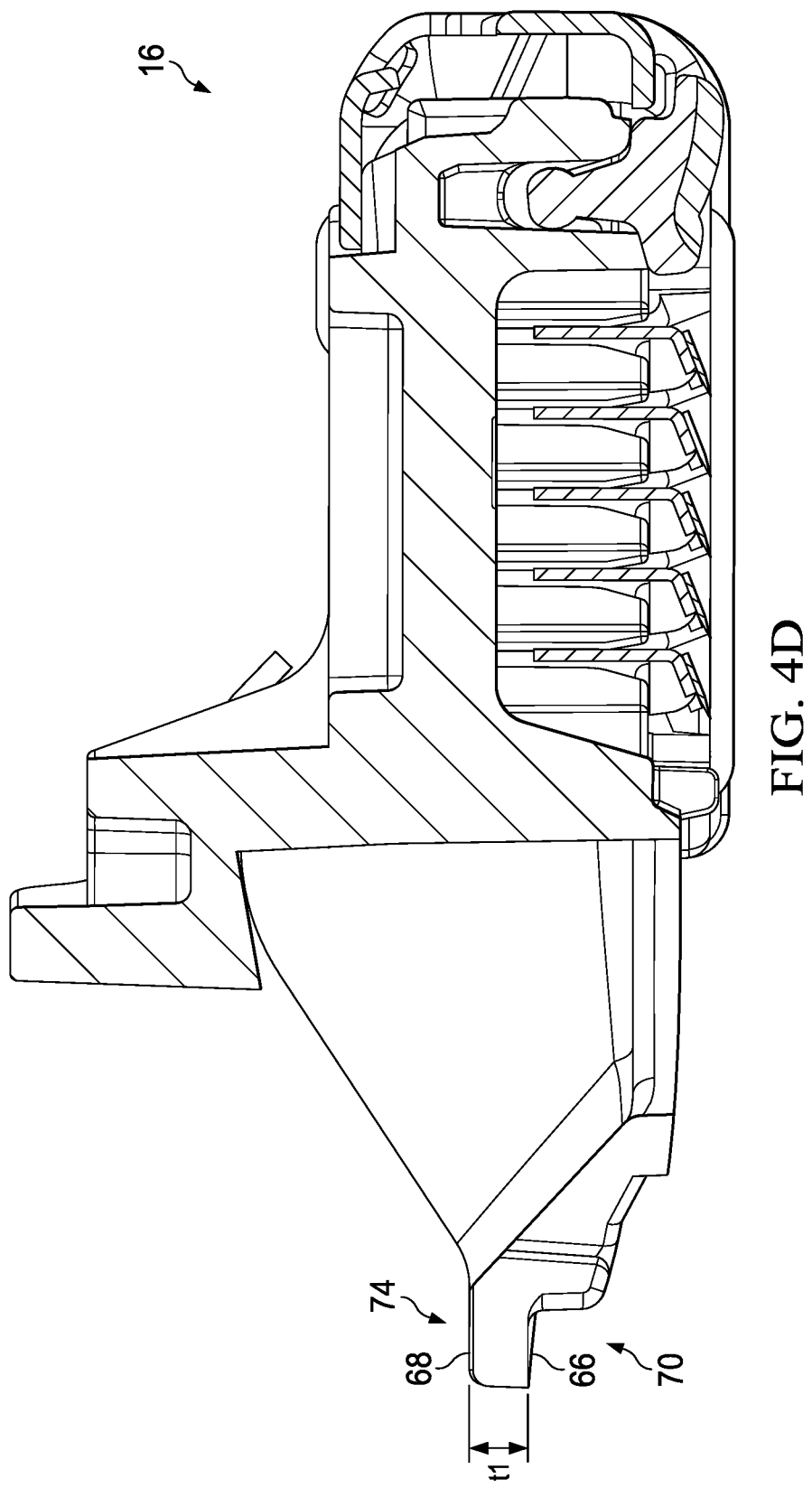
FIG. 4D is a cross section view of the housing, taken generally along the line 4-4 of FIG. 4B

The gap 78 may extend from the top surface 66 to the bottom surface 68 of the housing 16 and from the front walls 80 and 82 of the respective arms 70 and 72 to a rear wall 84 and 86 of the respective arms 70 and 72. In certain embodiments, the arms 70 and 72 may have a width "w1" of about 0.5 mm to about 15 mm (FIG. 4C) and more preferably about 3 mm to about 11 mm. The rear walls 84 and 86 may be part of the wall 62 that defines the partially enclosed opening 64. As shown in FIG. 4C, the distal ends 74 and 76 may be spaced apart at the front walls 80 and 82 by a distance d1 of about 0.1 mm to about 38 mm and more preferably about 0.75 mm to about 3 mm. The distal ends 74 and 76 may be spaced apart at the rear walls 84 and 86 by a distance d2 of about 0.1 mm to about 38 mm and more preferably about 0.75 mm to about 3 mm. It is understood that the gap 78 may not be uniform. For example, the size of the gap 78 may increase or decrease from the front walls 80 and 82 to the rear walls 84 and 86. In certain embodiments, the distal ends 74 and 76 may be spaced apart by a distance d3 of about 0.1 mm to about 38 mm and more preferably about 0.75 mm to about 3 mm, taken at a point between the front walls 80 and 82 and the rear walls 84 and 86 (e.g., taken at a position along a centerline of the arms 70 and 72). The distance d3 may be greater than the distance d1 and d2. FIG. 4D illustrates a cross section view of the housing 16, taken generally along the line 4-4 of FIG. 4B. Each arm 70 and 72 may have a thickness of "t1" extending from the top surface 66 to the bottom surface 68 of about 0.5 mm to about 15 mm, measured at the respective distal ends 74 and 76 of each arm 70 and 72.

In certain embodiments, the gap 78 may form a shape, such as an arrow (See FIG. 4B), to indicate the proper direction and positioning for attaching the handle 14 to the shaving razor cartridge 12. Accordingly, the gap 78 may act as a handle docking alignment member that indicates an intended docking direction for the handle 14 to be inserted into the opening 26. The handle docking alignment member (e.g., the gap 78) may be in communication with the opening 26 for receiving the handle 14. As will be explained in greater detail below, the gap 78 may be filled with a different material having a contrasting color to the housing 16 to provide a more noticeable and intuitive alignment for the user.

Figure 5A:
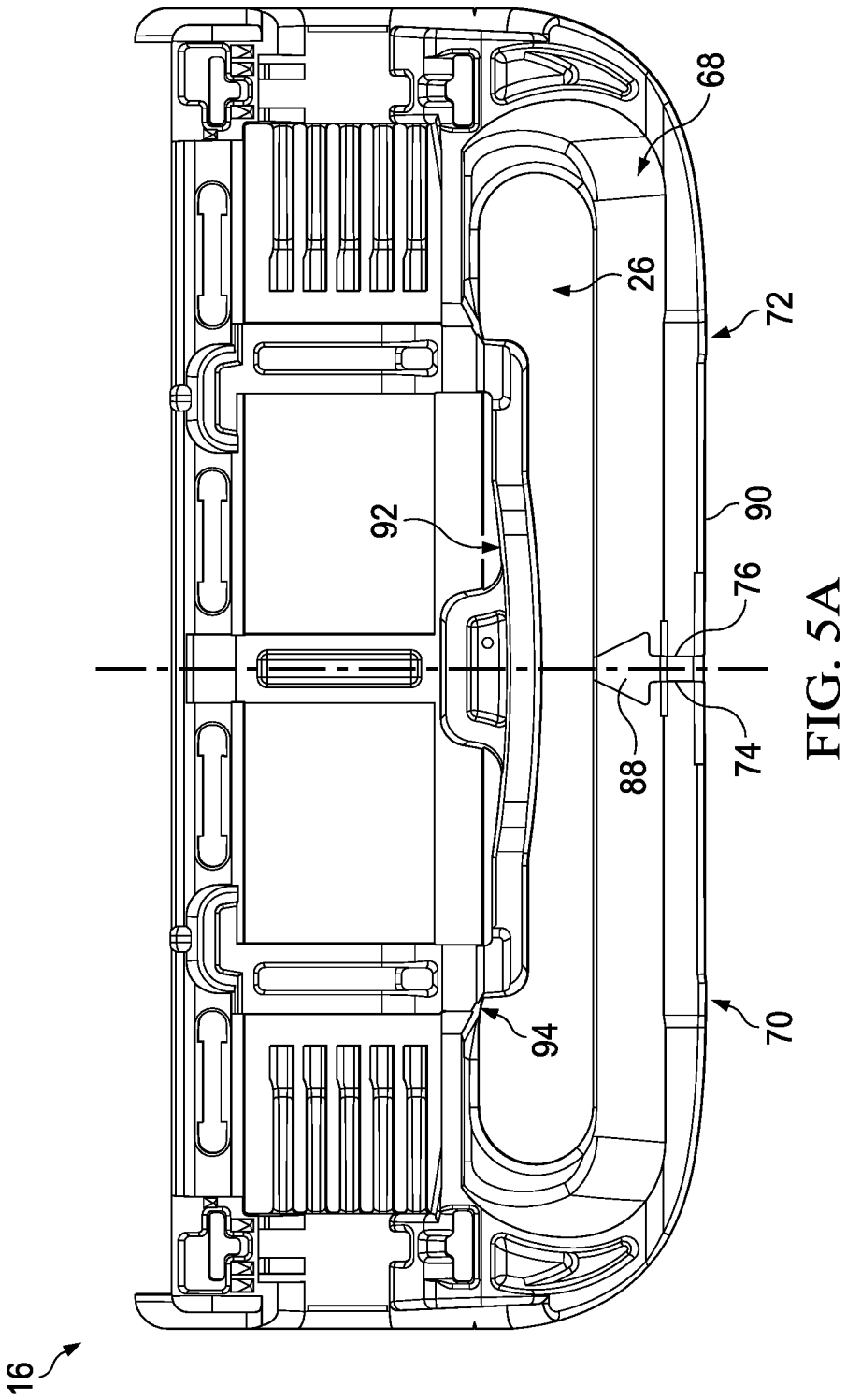
FIG. 5A is a bottom view of the housing having a bridge.
Figure 5B:
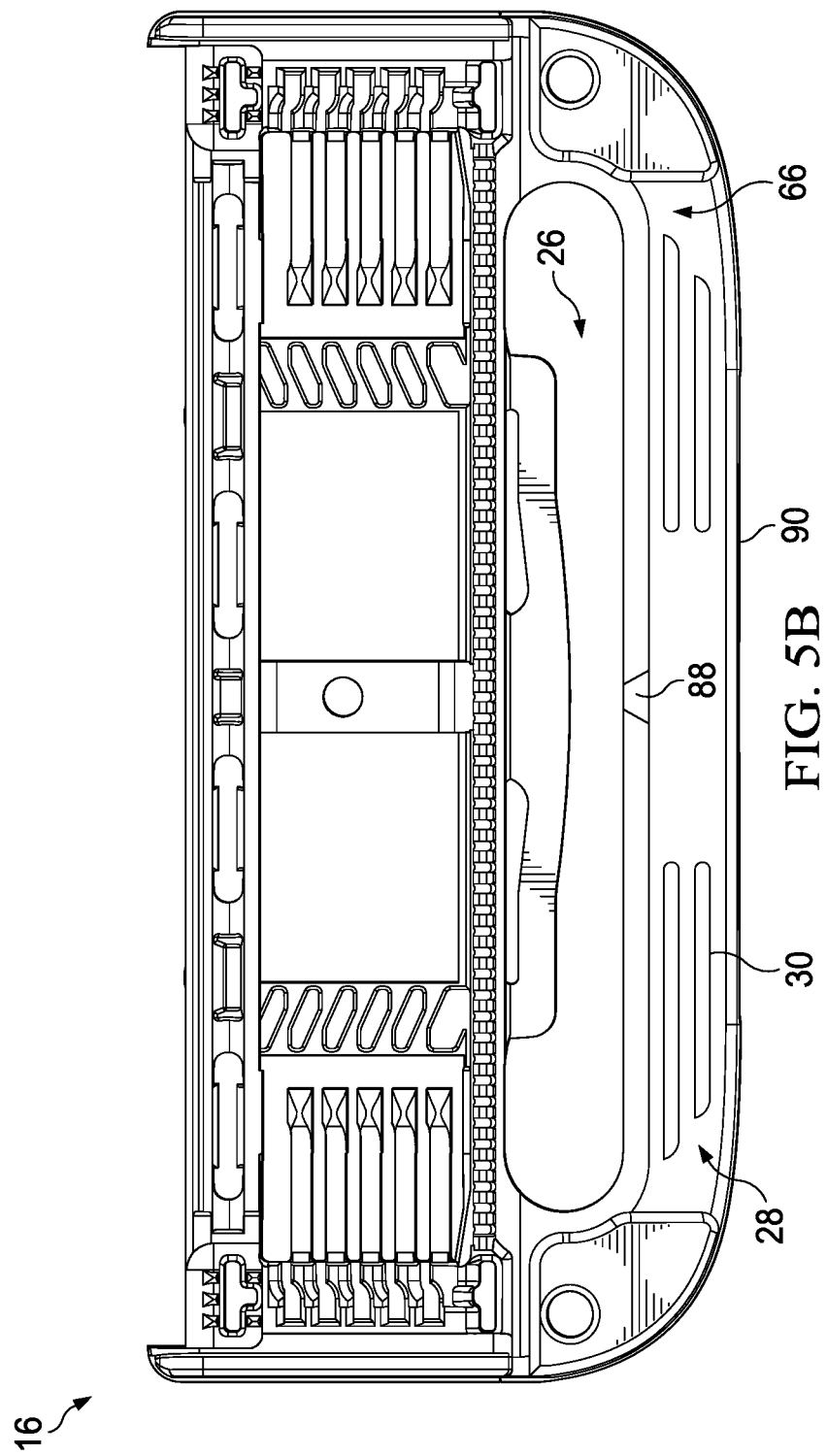
FIG. 5B is a top view of the housing of FIG. 5A.

Referring to FIGS. 5A, 5B and 5C the housing 16 is shown with a bridge 88 filling the gap 78 (FIG. 4C) and interconnecting the pair of arms 70 and 72 (e.g., the distal ends 74 and 76), thus forming the enclosed opening 26. The bridge 88 and the arms 70 and 72 may form a front wall 90. The housing 16 may be injection molded with the first polymeric material and then a second polymeric material may be co-injection molded over the first polymeric material of the housing 16 to interconnect the pair of arms 70 and 72 (e.g., bonding the pair of arms 70 and 72 together). The second polymeric material may be an thermo-plastic elastomer material to provide support and flexibility to the pair of arms 70 and 72. In certain embodiments, the second polymeric material 88 that forms the bridge 88 may extend over a portion of the top surface 66 of the housing 16 to form the skin engaging member 28 and the protrusions 30 (see FIG. 5B). The bridge 88 may also cover a portion of the bottom surface 68 to provide extra impact resistance to help prevent the arms 70 and 72 from being damaged or breaking (e.g., when dropped onto a bathroom tile floor). The bridge member 88 may be injection molded from an thermo-plastic elastomer material which may further improve impact resistance.

Accordingly, the bridge 88 may not only make the housing 16 more manufacturable and impact resistant, but may also form the skin-engaging member 28 and protrusions 30 on the top surface 66 of the housing 16 to improve skin stretch during a shaving stroke. It may be beneficial for the bridge 88 to interconnect the distal ends 74 and 76, but not cover the bottom surface 68 because a polymeric material used to improve skin stretching, may not allow for smooth insertion of the handle 14 into the opening 26. In certain embodiments, the bridge 88 may comprise a lubricous material or a water leachable shaving aid that may also cover a portion of the top surface 66 of the housing 16 (e.g., the skin engaging member 28). A polymeric material having a lower coefficient of friction than the housing 16 may improve glide of the skin engaging member 28 and may also improve insertion of the handle 12 into the opening 26.

In certain embodiments, the bridge 88 may comprise a polymeric material that is a different color than the housing 16. The contrasting color of the bridge 88 and the housing 16 may act as an indicator for the consumer to properly insert the handle 14 into the opening 26. The proper insertion of the handle 14 may also be aided by the shape of the bridge 88. In certain embodiments, the bridge 88 may form a shape, such as an arrow, to indicate the proper positioning for attaching the handle 14 to the shaving razor cartridge 12. Accordingly, the bridge 88 may act as a handle docking alignment member that indicates an intended docking direction for the handle 14 to be inserted into the opening 26. The handle docking alignment member (e.g., the bridge 88) may be on the same surface (e.g., bottom surface 68) that defines the opening 26 for receiving the handle 14 to be more intuitive to the consumer. The handle docking alignment member (e.g., the bridge 88) may be positioned along a centerline "CL" of the housing 16. The bottom surface 68 of the housing 16 may include a handle locking member 92 (FIG. 5A) that secures a portion of the handle 14 (FIG. 1) within the opening 26. The handle locking member 92 may be positioned behind the handle docking alignment member (e.g., the bridge 88) to indicate the intended position of the handle 14 (FIG. 1) for proper attachment with the shaving razor cartridge 12 (FIG. 1). The handle locking member 92 may be extend from interior wall 94 of the housing 16 extend over the opening 26.

Figure 6:
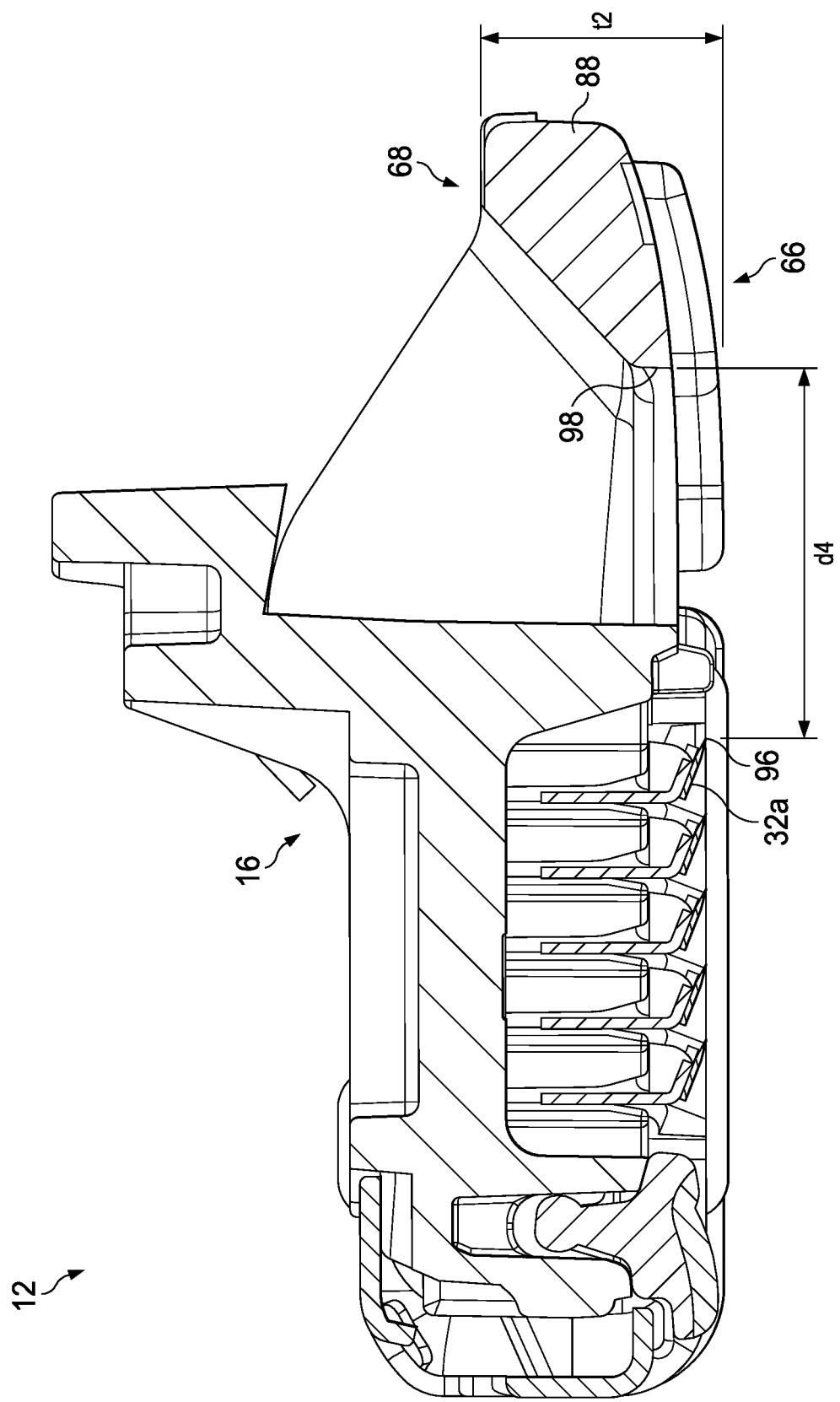
FIG. 6 is a cross section view of the shaving razor cartridge, taken generally along the line 6-6 of FIG. 2.

Referring to FIG. 6, a cross section view of the shaving razor cartridge 12 is shown. The bridge 88 may have a thickness "t2" of about 0.5 mm to about 15 mm and more preferably about 2 mm to about 7 mm. The bridge 88 may extend from the bottom surface 68 to the top surface 66. The thickness "t2" may be increased to improve the integrity of the shaving razor cartridge 12. Typically the most hazardous area of the housing 16 to fail is near the blades 32. Accordingly, it may be beneficial to have the bridge 88 closer to the first blade 32a. A rear wall 98 of the bridge 88 may be about 2.5 mm to about 7 mm to a cutting edge 96 of the first blade 32a.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a shaving razor cartridge comprising:
   injection molding a first polymeric material to form a housing comprising a wall defining an opening, the opening extending from a top surface to a bottom surface of the housing, the opening is configured to receive a portion of a handle, the wall having a pair of arms each with a distal end, the distal end of each of the pair of arms extending toward each other defining a gap;
   interconnecting the distal end of each of the arms by injection molding a second material that is different than the first polymeric material to form a bridge;
   mounting at least one blade to the housing; and
   securing the at least one blade to the housing.

2. The method of claim 1 wherein said injection molding the second polymeric material comprises injection molding the second polymeric material that is a different color than a color of the first polymeric material.

3. The method of claim 1 further comprising inserting a portion of a handle into the opening of the housing and covering the bridge member with the portion of the handle.

4. The method of claim 1 further comprising wherein said injection molding the second polymeric material comprises injection molding a thermo-plastic elastomer that is different than a polymeric material of the housing.

5. The method of claim 1 further comprising forming a skin contacting surface on the top surface of the housing that is interconnected with the bridge.

6. A shaving razor cartridge comprising:
a housing having a top surface and a bottom surface;
a guard at a front of the housing;
a cap at a rear of the housing; and
at least one blade mounted to the housing between the guard and the cap, wherein the housing comprises a wall defining an opening, the opening extending from the top surface to the bottom surface, the opening is configured to receive a portion of a handle, the wall having a pair of arms each with a distal end, the distal end of each of the pair of arms extending toward each other defining a gap, wherein a bridge is formed within the gap, the bridge comprises a thermo-plastic elastomer that is different than a polymeric material of the housing.

7. The shaving razor cartridge of claim 6 wherein the bridge forms a skin contacting surface on the top surface of the housing.

8. The shaving razor cartridge of claim 6 wherein the gap forms an arrow shape.

9. The shaving razor cartridge of claim 6 further comprising a handle locking member extending from an interior wall of the housing and over the opening.

10. The shaving razor cartridge of claim 9 wherein the locking member is generally aligned with the gap.

11. The shaving razor cartridge of claim 6 wherein the gap is positioned on a center line of the housing.

* * * * *